United States Patent [19]
Hohmann et al.

[11] Patent Number: 5,318,332
[45] Date of Patent: Jun. 7, 1994

[54] HOSE COUPLING

[75] Inventors: Ralf Hohmann, Bruchköbel; Gerhard Winterstein, Bad Vilbel; Ralf Spors, Bruchköbel, all of Fed. Rep. of Germany

[73] Assignee: Rasmussen GmbH, Maintal, Fed. Rep. of Germany

[21] Appl. No.: 938,797

[22] Filed: Sep. 1, 1992

[30] Foreign Application Priority Data

Sep. 4, 1991 [DE] Fed. Rep. of Germany ....... 4129397

[51] Int. Cl.⁵ .................. F16L 35/00; F16L 37/12
[52] U.S. Cl. ............................ 285/24; 285/307; 285/361; 285/376
[58] Field of Search ............... 285/361, 24, 307, 319, 285/360, 376, 401

[56] References Cited

U.S. PATENT DOCUMENTS

| | | | |
|---|---|---|---|
| 551,733 | 12/1895 | Mullenhoff | 285/361 |
| 3,162,470 | 12/1964 | Davidson et al. | 285/376 |
| 3,698,744 | 10/1972 | Bevington | 285/376 |
| 4,708,375 | 11/1987 | Sauer | 285/258 |
| 4,786,085 | 11/1988 | Sauer | 285/24 |
| 5,064,227 | 11/1991 | Spors | 285/319 |

FOREIGN PATENT DOCUMENTS 3231950 5/1991 Fed. Rep. of Germany.
465241 5/1937 United Kingdom ............... 285/307

Primary Examiner—P. Austin Bradley
Assistant Examiner—Jeffrey T. Knapp
Attorney, Agent, or Firm—Darby & Darby

[57] ABSTRACT

A device for separably coupling one end portion of a rigid or elastically deformable hose to a nipple has a first tubular element which is non-rotatably and sealingly secured to the one end portion of the hose, and a second tubular element which is rotatable on the first element and carries first detent members separably engageable with one or more second detent members on the nipple. Engagement of the first detent members with and/or their disengagement from the second detent member or members on the nipple merely necessitates rotation of the second tubular element relative to the nipple and relative to the first tubular element, i.e., the hose need not be twisted and/or otherwise deformed in order to couple it to, or to disengage it from, the nipple. A sealing ring is provided to automatically engage the first tubular element and the nipple when the first detent members are properly connected to the second detent member or members.

17 Claims, 1 Drawing Sheet

HOSE COUPLING

BACKGROUND OF THE INVENTION

The invention relates to improvements in devices for separably securing one end portion of a first tube to a second tube. The first tube can constitute a hose and the improved devices then constitutes hose couplings which can separably but sealingly secure the one end portion of the hose to a metallic or plastic nipple, e.g., under the hood of or elsewhere in a motor vehicle.

Hose couplings of the type to which the present invention pertains are disclosed, for example, in commonly owned U.S. Pat. No. 4,708,375 granted Nov. 24, 1987 to Heinz Sauer for "Hose coupling" and in commonly owned U.S. Pat. No. 4,786,085 granted Nov. 22, 1988 to Heinz Sauer and Wilfried Heise. These patents disclose couplings wherein one end portion of a hose is clamped between two tubular connecting elements one of which can be detachably coupled to a second tube. The clamping action is rather pronounced in order to prevent leakage of fluid between the one end portion of the hose and the one connecting element. A sealing ring is interposed between the other connecting element and the second tube to thus prevent leakage of confined fluid between the one end portion of the hose and the second tube. The clamping action is or can be so pronounced that it actually equals a bond between the one end portion of the hose and at least one of the connecting elements. Male and female coupling members are provided on the one connecting element and on the second tube to ensure that the one connecting element can be releasably attached to the second tube in response to rotation of the one connecting element relative to the second tube, i.e., the one end portion of the hose must be rotated with the connecting elements. This can create problems if the other end portion of the hose is non-rotatably connected to another part, e.g., to a second nipple; it is then necessary to subject the hose to torsional deforming stresses which can affect the integrity and can shorten the useful life of the hose. Moreover, twisting of the hose necessitates the exertion of a substantial force, even if the hose is made of rubber or another highly elastomeric material. The situation is aggravated if the hose is made of a relatively hard plastic material, e.g., polyamide, polyoxymethylene, polypropylene or polyvinyl chloride. Such hoses cannot be twisted at all. Disengagement of the hose coupling again necessitates the application of torsional stresses because the one end portion of the hose cannot rotate relative to the connecting elements or vice versa.

A somewhat similar hose coupling is disclosed in German Pat. No. 32 31 950 granted May 29, 1991 to Rene Iff. This coupling also employs means for mechanically clamping one end portion of an elastomeric hose between two rigid connecting elements one of which can be separably coupled to a nipple.

OBJECTS OF THE INVENTION

An object of the invention is to provide a hose coupling wherein the hose need not be twisted and/or otherwise deformed or stressed for the purpose of connecting it to, or of disconnecting it from, a nipple or the like.

Another object of the invention is to provide a coupling whose manipulation necessitates the exercise of a minimal effort.

A further object of the invention is to provide a novel and improved connector between two tubes one of which constitutes or can include a flexible hose.

An additional object of the invention is to provide a novel and improved connection between the parts of a device which is used to separably couple a flexible or rigid hose to a nipple or the like.

Still another object of the invention is to provide a hose coupling which can be engaged or disengaged within a short interval of time and without necessarily resorting to any tools.

A further object of the invention is to provide a hose coupling which can be manipulated by hand or by an automaton.

Another object of the invention is to provide a hose coupling which can be utilized with advantage under the hood of, or elsewhere in, a motor vehicle.

An additional object of the invention is to provide a hose coupling which comprises a small number of relatively simple parts.

Still another object of the invention is to provide a motor vehicle which embodies one or more hose couplings of the above outlined character.

A further object of the invention is to provide a novel and improved method of separably coupling a hose to a nipple or the like in such a way that the hose need not he subjected to any, or any appreciable, torsional and/or other stresses.

An additional object of the invention is to provide a novel and improved coupling which can be utilized to separably connect a rigid or practically rigid hose to a nipple or the like.

SUMMARY OF THE INVENTION

The invention is embodied in a device for separably securing one end portion of a first tube (e.g., a hose) to a second tube (e.g., a nipple on a cooling unit in a motor vehicle). The improved device comprises an at least partly tubular first connecting element having means (e.g., ribs) for sealingly engaging the one end portion of the first tube, a second connecting element which is rotatably connected with the first connecting element, and means for releasably coupling the second connecting element with the second tube. The coupling means comprises a plurality of first detent members on the second connecting element and at least one second detent member on the second tube. The first detent members are engageable with and/or disengageable from the at least one second detent member upon rotation of the second connecting member relative to the first connecting member and relative to the second tube. The arrangement is or can be such that the first detent members are engageable with the at least one second detent member in response to rotation of the second connecting element relative to the first connecting element and relative to the second tube in a first direction and that the first detent members are disengageable from the at least one second detent member upon rotation of the second connecting element relative to the first connecting element and relative to the second tube in a second direction counter to the first direction. The engaging means can be designed to be sealingly receivable in the one end portion of the first tube, preferably in such a way that the one end portion of the first tube is non-rotatably engaged by the first connecting element.

One of the connecting elements can be provided with a ring-shaped socket, and the other connecting element is then provided with a ring-shaped projection or portion which is rotatably received in the socket. The projection can consist of a circumferentially complete portion of the other connecting element or it can comprise two or more spaced apart sections which together form what can be termed a ring-shaped projection. For example, the socket can be provided in the external surface of the first connecting element and can extend circumferentially of the first connecting element, and the projection can be provided in the second connecting element. The connecting elements are preferably provided with means for confining the projection in the socket; such confining means can comprise circumferentially extending shoulders in the socket and/or on the projection.

The first connecting element has a first end and a second end receivable in the second tube. The engaging means is provided at the first end (i.e., it is nearer to the first end than to the second end of the first connecting element), and such device can further comprise means for establishing a fluid-tight seal between the first connecting element and the second tube in response to insertion of the second end into the second tube. The means for establishing a fluidtight seal can comprise at least one ring-shaped seal an O-ring) which surrounds the second end of the first connecting element.

The at least one second detent member can comprise a collar on the second tube and a plurality of arcuate circumferentially extending channels adjacent the collar. The collar can be provided with a conical flank which faces away from the channels and with a substantially radial flank which is adjacent the channels. The first detent members are resiliently deformable and have protuberances (e.g., in the form of teeth) which are slidable along the conical flank, over the collar and into the channels. The at least one second detent member can further comprise means for expelling the protuberances from the channels in response to rotation of the second connecting element relative to the second tube. The excelling means can comprise bridges which are provided between the channels and have ramps for expulsion of protuberances from the channels in response to rotation of the second element relative to the second tube. The collar can be provided with projections in line with the bridges to guide the protuberances of the first detent members in response to movement of the second connecting element away from the second tube upon expulsion of the protuberances from the channels.

Alternatively, the at least one second detent member can comprise a collar which may but need not have a conical front flank but is provided with axially extending inlets each of which communicates with one of the channels, there being at least one inlet for each first detent member. The protuberances enter the inlets in response to movement of the second connecting element toward the second tube, and the protuberances thereupon enter the respective channels in response to rotation of the second connecting element relative to the second tube. The just described combination of first and second detent members can be said to constitute a simple bayonet mount which is preferably designed to maintain the protuberances of the first detent members in the respective channels of the second detent member by friction. The first detent members of the bayonet mount may but need not be resiliently deformable.

The novel features which are considered as characteristic of the invention are set forth in particular in the appended claims. The improved coupling or securing device itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED
EMBODIMENTS

Figure 1:
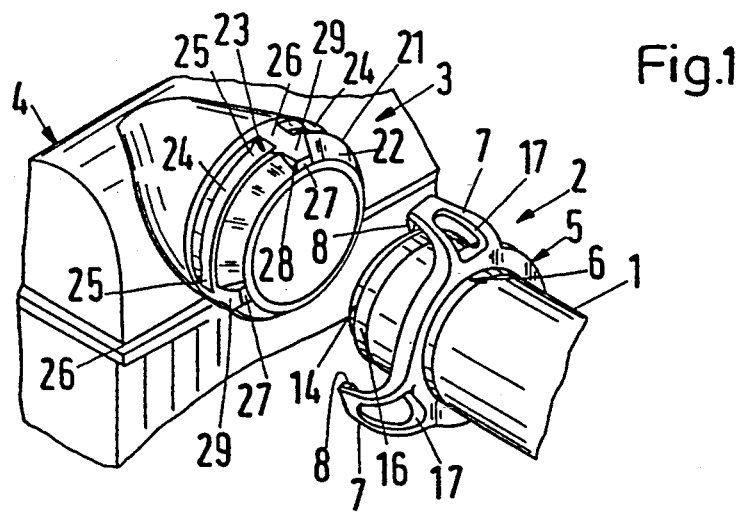
FIG. 1 is an exploded perspective view of a hose coupling which embodies one form of the invention, the sealing portion of the first connecting element being received in one end of a first tube, which constitutes a hose, and the coupling unit having three first detent members on the second connecting element and three complementary second detent members on the second tube.
Figure 2:
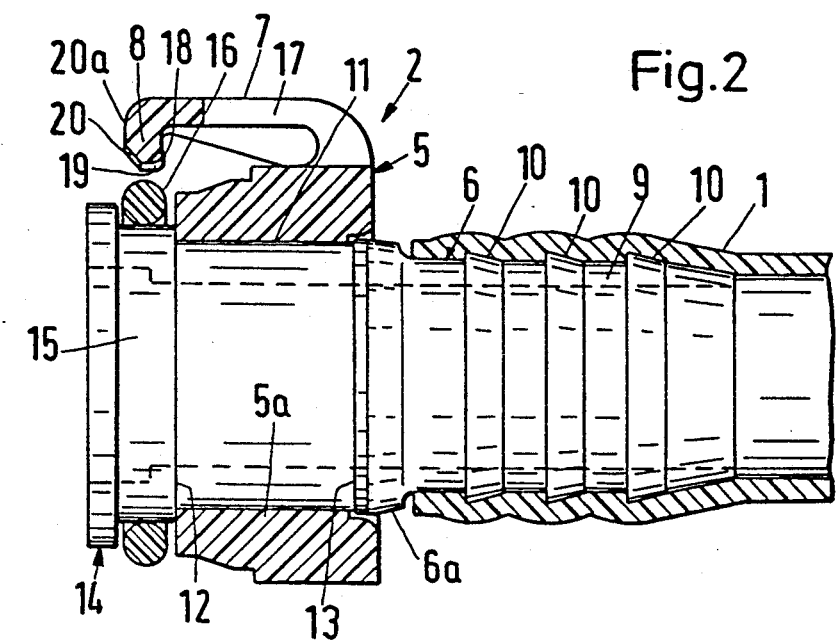
FIG. 2 is an enlarged axial sectional view of the first and second connecting elements of the hose coupling which is shown in FIG. 1.

FIGS. 1 and 2 show a coupling which serves to separably connect one end of a first tube 1 with a second tube 3 forming an integral or separably produced nipple of a radiator or another cooling unit under the hood of a motor vehicle. The first tube 1 is a hose which is assumed to be made of a relatively hard plastic material such as polyamide, polyoximethylene, polypropylene or polyvinyl chloride. However, it is equally possible to employ a hose which is made of rubber or other readily deformable elastomeric material. The coupling comprises a composite connector 2 including a tubular first connecting element 6 having an externally ribbed and/or otherwise serrated portion 9 which is sealingly inserted into the illustrated end portion of the hose 1. The external ribs of the sealing portion 9 are shown at 10. The composite connector 2 further comprises a tubular second connecting element 5 which is rotatably mounted on an intermediate portion of the element 6 and carries three equidistant male first detent members 7. The elements 5 and 6 of the connector 2 can be made of a synthetic thermoplastic material which can exhibit a certain relatively small amount of elasticity.

The external surface of the intermediate portion of the connecting element 6 is provided with a circumferentially extending groove or recess 11 which receives a ring-shaped internal projection 5a of the connecting element 5 in such a way that the element 5 can rotate relative to the element 6 and relative to the second tube 3 (hereinafter called nipple) on the radiator 4. The recess 11 is flanked by two radially extending shoulders 12, 13 which cooperate with the adjacent internal radial shoulders of the element 5 to confine the projection 5a to rotational movements relative to the intermediate portion of the element 6. The left-hand end portion of the connecting element 6 includes a radially outwardly extending flange 14 forming part of means for establishing a fluidtight seal between the element 6 and the nipple 3. Such means for establishing a fluidtight seal further comprises a ring-shaped seal 16 (here shown as an elastically deformable O-ring) which extends into a circumferential groove 15 provided in the external surface of the element 6 adjacent the flange 14. The O-ring 16 is deformed into sealing engagement with the connecting element 6 as well as with the internal surface of the nipple 3 when the flange 14 is introduced into the axial passage of the nipple and the male detent members 7 of the connecting element 5 properly engage the corresponding female detent members 23 at the exterior of the nipple.

The male detent members 7 include radially deformable resilient arms the free ends of which are provided with substantially radially inwardly extending protuberances in the form of teeth 8. These male detent members are rotatable with the connecting element 5 relative to the connecting element 6 because the portion 9 of the element 6 is non-rotatably held by friction in the illustrated end portion of the hose 1.

Each male detent member 7 has an opening or window 17 for convenience of manufacture, to reduce the overall weight and to reduce the overall cost of the connecting element 5. Furthermore, the windows 17 enhance the flexibility of the detent members 7.

FIG. 2 shows that the intermediate portion of the connecting element 6 is slightly conical, as at 6a, so as to effect slight and gradual radial expansion of the elastically deformable element 5 and/or slight radial compression or contraction of the element 6 when the latter is introduced into the element 5 in such a way that the end portion 9 has passed through the annular projection 5a before the projection 5a is engaged and expanded by the conical portion 6a until the projection 5a snaps into the socket 11 to thus ensure that the projection 5a is thereupon confined between the shoulders 12 and 13. The diameter of the shoulder 13 is only slightly larger than the diameter of the cylindrical surface in the bottom zone of the socket 11. This completes the assembly of the intermediate connector 2 in such a way that the elements 5, 6 are free to rotate relative to each other.

The number of male detent members 7 can be reduced to two or increased to four or more. Irrespective of the selected number of male detent members 7, they are preferably equidistant from each other in the circumferential direction of the element 5 to ensure that the latter can be releasably coupled to the nipple 3 in a plurality of different starting angular positions of the parts 3 and 5 relative to each other.

The tooth 8 of each male detent member 7 has a substantially radially extending inner flank 18 which faces toward the end portion of the hose 1, i.e., toward the end portion 9 of the connecting element 6, an arcuate top land 19 which extends circumferentially of the element 5 and merges gradually into the radially innermost portion of the respective inner flank 18, and a conical outer flank 20 which is located opposite the inner flank 18 and makes with the axis of the element 5 an acute angle, e.g., an angle of 30°.

The free end of the nipple 3 is provided with a circumferentially complete collar 21 including a conical front face or flank 22 having an inclination which preferably matches or at least approximates the inclination of the flanks 20. The other or rear face or flank (not seen in FIG. 1) of the collar 21 extends substantially radially of the nipple 3 and includes three arcuate sections each forming part of one of the female second detent members 23. Each female detent member 23 further comprises an arcuate channel 24 which is provided in the external surface of the nipple 3 adjacent the radially extending rear flank of the collar 21.

The arcuate channels 24 of the female detent members 23 are separated from each other by radially outwardly extending expelling or disengaging components or bridges 26 each of which has at least one radially outwardly sloping concave cam face or ramp 25 extending into the bottom zone of the respective channel 24 and a radially outermost surface or flat 26 in line with the flat on the radially outermost portion of a projection 29 on the adjacent portion of the collar 21. Each projection 29 is flanked by two lateral faces 28 which diverge from each other in a direction from the front end toward the rear end of the nipple 3, and a front face 27 between the lateral faces 28. The flats at the radially outermost portions of the disengaging components 26 are flush with the radially outermost portion of the collar 21, the same as the flats on the radially outermost portions of the projections 29. The maximum distance between (the rear portions of) the lateral flanks 28 on each of the projections 29 is greater than the width of the respective disengaging components 26, as seen in the circumferential direction of the collar 21.

In order to couple the rotary connecting element 5 of the connector 2 (and hence the element 6 and the hose 1) with the nipple 3, the hose 1 is engaged by hand or by an automaton and is moved axially toward the nipple 3 so that the flange 14 and the O-ring 16 enter the nipple and the teeth 8 of the male detent members 7 strike against and begin to slide along the front flank 22 of the collar 21 in a direction toward and beyond the radially outermost portion of the collar. This results in flexing of the male detent members 7 In the region of their windows 17, and these members store energy which suffices to propel their teeth 8 into the respective channels 24 and against the radially extending rear flank of the collar 21 to thus complete the coupling operation. At such time, the O-ring 16 is deformed and sealingly engages the adjacent portion of the connecting element 6 as well as the internal surface of the nipple 3. Moreover, the radially extending inner flanks 18 of the three teeth 8 are located in the respective channels 24 and abut the radially extending rear flank of the collar 21 to prevent accidental disengagement of the connector 2 from the nipple 3.

If the initial angular positions of the connecting element 5 and nipple 3 relative to each other are such that the conical front flank 22 of the collar 21 is not engaged by the sloping front flanks 20 of the teeth 8 because the faces 20a radially outwardly of the flanks 20 happen to strike the front faces 27 of the projections 29, the connecting element 5 is simply rotated relative to the nipple 3 and relative to the connecting element 6 and hose 1 until the conical front faces 20 are free to strike the adjacent portions of the conical collar 21. This enables the collar 21 to flex the male detent members 7 in the aforedescribed manner until the teeth 8 advance along and beyond the front flank 22 and penetrate into the respective channels 24. Thus, accidental engagement of projections 29 by the teeth 8 during movement of the connecting element 5 toward engagement of its male detent members 7 with the female detent members 23 of the nipple 3 can be attended to without the need to rotate or twist the hose 1 because the element 5 is free to rotate on the intermediate portion of the element 6.

In order to disengage the connector 2 from the nipple 3, the operator must rotate the connecting element 5 relative to the nipple and, if necessary, relative to the connecting element 6 and hose 1. Alternatively, the operator can resort to a tool which is designed to pivot, or is capable of pivoting, the male detent members 7 radially outwardly in order to extract their teeth 8 from the respective channels 24. The connecting element 5 can be rotated in a clockwise direction or in a counterclockwise direction because each disengaging component 26 is preferably flanked by two concave cam faces or ramps 25. Such rotation of the connecting element 5 relative to the nipple 3 results in advancement of the top lands 19 of the teeth 8 onto the top faces of the respective components 26 whereupon the element 5 is simply pulled in a direction away from the nipple 3 and radiator 4 so that the top lands 19 slide along the top faces of the components 26 toward and onto and forwardly beyond the top lands of the projections 29. This completes the disengagement of the connector 2 and hose 1 from the nipple 3.

Figure 3:
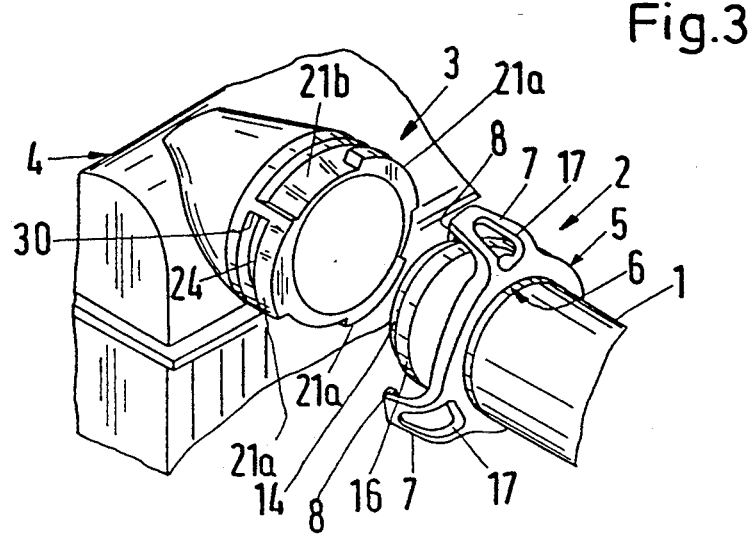
FIG. 3 is an exploded perspective view of a modified hose coupling wherein the coupling unit comprises three different second detent members on the second tube.

FIG. 3 shows a nipple 3 which is provided with a modified female detent member having three circumferentially extending channels 24 and with a modified collar 21a having three axially parallel cutouts or inlets 21b. Each cutout 21b communicates with one of the channels 24, and each channel 24 has a closed end 30 which is remote from the respective cutout 21b. The construction of the connector 2 and of the male detent members 7 is or can be the same as described and shown in FIGS. 1 and 2.

In order to separably couple the connector 2 of FIGS. 2 and 3 with the nipple 3 of FIG. 3, an operator must move the connector 2 axially toward the nipple in such orientation that the prong of each male detent member 7 enters one of the cutouts 21b in the collar 21a. The connecting element 5 is thereupon rotated relative to the nipple 3 and (if necessary) relative to the connecting element 6 and hose 1 so that the teeth 8 enter the respective channels 24 and come to a halt upon reaching the respective closed ends 30. The connector 2 of FIGS. 2 and 3 is uncoupled from the nipple 3 of FIG. 3 by rotating the element 5 in a direction to move the teeth 8 circumferentially of the nipple toward positions of alignment with the respective cutouts 21b. The connector 2 is thereupon simply pulled axially and away from the nipple 3 so that the teeth 8 can be withdrawn from their channels 24 through the respective cutouts 21b. The manner in which the O-ring 16 is deformed into sealing engagement with the corresponding end portion of the connecting element 6 and with the internal surface of the nipple 3 of FIG. 3 (in response to introduction of the teeth 8 into the cutouts 21b and thence into the adjacent channels 24) in order to establish a sealing connection between the element 2 and hose 1 on the one hand, and the nipple 3 of FIG. 3 on the other hand, is the same as described above with reference to FIGS. 1 and 2.

The male and female detent members of FIGS. 2 and 3 can be said to constitute a bayonet mount which separably couples the connecting element 5 to the nipple 3 of FIG. 3. If the teeth 8 of the male detent members 7 strike the collar 21a of FIG. 3 between the cutouts 21b (while an operator is in the process of coupling the connector 2 with the nipple 3), it is merely necessary to rotate the element 5 until the teeth 8 move into alignment with and enter the corresponding cutouts 21b.

A difference between the hose coupling of FIGS. 1 and 2 on the one hand, and the hose coupling of FIGS. 2 and 3 on the other hand, is that the connecting element 5 need not always rotate in order to properly engage the complementary female detent members 23 on the nipple 3 of FIG. 1. On the other hand, the connecting element 5 must be rotated in order to engage or to disengage the complementary female detent member on the nipple 3 of FIG. 3.

An important advantage of the improved coupling is that the hose 1 need not be twisted preparatory to and-/or during attachment of the connector 2 to, or preparatory to or during disengagement of the connector 2 from, the nipple 3 of FIG. 1 or 3. This renders it possible to employ a hose or tube which exhibits a minimum of flexibility or no flexibility at all. Furthermore, the connector 2 can be coupled to or detached from the nipple 3 of FIG. 1 or 3 with a minimum of effort because such coupling or decoupling operation merely necessitates rotation of the connecting element 5 relative to the nipple 3 and relative to the element 6 and hose 1. The above holds true regardless of whether or not the teeth 8 of the male detent members 7 immediately engage and begin to slide radially outwardly along the conical front flank 22 of the collar 21 of FIG. 1 and regardless of whether or not the teeth 8 immediately find their way into the cutouts 21b of the collar 21a on the nipple 3 of FIG. 3.

An advantage of the connection including the socket 11 and the projection 5a of FIG. 2 is that the intermediate portion of the connecting element 6 can be inserted into the connecting element 5 in a simple and time-saving manner. Furthermore, once the connecting step is completed, the elements 5, 6 are free to rotate relative to each other but their axial positions remain unchanged because the projection 5a is confined to rotation between the shoulders 12 and 13.

An advantage of the flange 14 and O-ring 16 is that these parts establish a fluidtight seal between the connecting element 6 and the nipple 3 of FIG. 1 or 3 in automatic response to proper engagement of the male detent members 7 with the female detent member or members on the nipple.

The improved hose coupling is susceptible of numerous modifications without departing from the spirit of the invention. As already mentioned hereinbefore, the number of male detent members 7 can be reduced to two (these detent members are then preferably disposed diametrically opposite each other) or increased to four or more. The number of female detent members 23 on the nipple 3 of FIG. 1 or the number of cutouts 21b in the collar 21a on the nipple 3 of FIG. 3 is then reduced or increased accordingly. The configuration of the projections 29 can be altered to resemble that of the projections which are shown in the aforementioned commonly owned U.S. Pat. No. 4,786,085. The disengaging components 23 and the projection 29 which are shown on the nipple 3 of FIG. 1 can be replaced with disengaging components and projections of the type disclosed in commonly owned U.S. Pat. No. 5,064,227 granted Nov. 12, 1991 to Ralf Spors, Gerhard Wachter, Ralf Hohmann and Heinz Sauer for "Connector for hoses and the like". The disclosures of all patents which are mentioned herein are incorporated by reference. It is further possible to replace the connecting component 6 with a substantially L-shaped component one leg of which is inserted into or is otherwise sealingly connected with one end portion of a hose and the other leg of which carries the O-ring 16 and is rotatably surrounded by the connecting element 5.

The channels 24 are optional features of the detent members on the nipple 3. All that counts is to provide one or more detent members which have substantially radially extending flanks and are complementary to and can be engaged by the teeth 8 of the male detent members 7 after the teeth slide over and beyond the conical flank 22.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A device for separably securing one end portion of a first tube to a second tube, comprising an at least partly tubular first connecting element having means for sealingly engaging the one end portion of the first tube; a second connection element being rotatably connected with respect to the first connecting element; and means for releasably coupling said second connecting element with the second tube, comprising a plurality of first detent members on said second connecting element and at least one complementary second detent member on the second tube, said at least one second detent member being engageable with and disengageable from said plurality of first detent members upon rotation of said second connecting element relative to said first connecting element relative to the second tube.

2. The device of claim 1, wherein said first detent members are engageable with said at least one second detent member upon rotation of said second connecting element relative to said first element and said second tube in a first direction, said first detent members being disengageable from said at least one second detent member upon rotation of said second connecting element relative to said first connecting element and relative to the second tube in a second direction counter to said first direction.

3. The device of claim 1, wherein said engaging means is sealingly receivable in the one end portion of the first tube.

4. The device of claim 1, wherein the first tube is a hose and said engaging means is non-rotatably receivable in the one end portion of the hose.

5. The device of claim 1, wherein said first and second detent members together constitute a bayonet mount.

6. The device of claim 1, wherein one of said connecting elements has a ring-shaped socket and the other of said connecting elements has a projection rotatably received in said socket.

7. The device of claim 6, wherein said first connecting element has an external surface and said socket is provided in said external surface and extends circumferentially of said first connecting element, said projection being provided in said second connecting element.

8. The device of claim 7, wherein said connecting elements comprise means for confining said projection in said socket.

9. The device of claim 1, wherein said first connecting element has a first end and a second end receivable in the second tube, said engaging means being provided at said first end and further comprising means for establishing a fluid-tight seal between said first connecting element and the second tube in response to insertion of said second end into said second tube.

10. The device of claim 9, wherein said means for establishing a fluidtight seal comprises at least one ring-shaped seal surrounding said second end.

11. The device of claim 1, wherein said at least one second detent member comprises a collar on said second tube.

12. The device of claim 11, wherein said at least one second detent member further comprises a plurality of circumferentially extending channels adjacent said collar.

13. The device of claim 11, wherein said collar has inlets and said first detent members have protuberances arranged to enter said inlets in response to movement of said second element toward the second tube and to thereupon engage said radial flank in response to rotation of said second element relative to the second tube.

14. The device of claim 11, wherein said collar has a conical flank and a substantially radial flank, said first detent members being resiliently deformable and having protuberances slidable along said conical flank over said collar to abut said radial flank.

15. The device of claim 14, wherein said at least one second detent member further comprises means for moving said protuberances away from engagement with said radial flank in response to rotation of said second element relative to the second tube.

16. The device of claim 15, wherein said moving means comprises bridges provided at said radial flank and having ramps for moving said protuberances radially outwardly of said radial flank in response to rotation of said second element relative to the second tube.

17. The device of claim 16, wherein said collar has projections in line with said bridges to guide said protuberances in response to movement of said second element away from the second tube upon movement of said protuberances radially outwardly beyond said radial flank.

* * * * *